Aug. 12, 1924.

C. OTTO 1,504,493

VERTICAL CHAMBER OVEN

Original Filed Feb. 6, 1922

Inventor
Carl Otto
By W. J. Bissing atty.

Patented Aug. 12, 1924.

1,504,493

UNITED STATES PATENT OFFICE.

CARL OTTO, OF HELLERUP, DENMARK.

VERTICAL CHAMBER OVEN.

Original application filed February 6, 1922, Serial No. 534,627. Divided and this application filed February 20, 1924. Serial No. 694,102.

*To all whom it may concern:*

Be it known that I, CARL OTTO, a citizen of the Republic of Germany, whose address is Hellerup, Sundvey 14, Denmark, have invented certain new and useful Improvements in Vertical Chamber Ovens, of which the following is a specification.

The invention refers to vertical chamber ovens with horizontal heating flues and particularly to those in which both gas and air are preheated by the waste heat of the ovens in separate, special and individual recuperators, or preheaters, this application being a division of an application filed by me February 6, 1922, under Serial Number 534,627. In the present application the invention relates to a double vertical oven. The preheating chambers for gas and air are arranged in the prolongations of the horizontal heating flues forming axial extensions thereof and are placed within the ovens, in advance of the narrow sides of the oven chambers. The heating flues are arranged one above the other. Each is connected at one end with a preheating chamber of two compartments, one for air and the other for gas, and with a waste heat chamber at the other end. At each front of the oven the waste heat chambers alternate vertically with the preheating chambers, so that the preheating chambers lie between the waste heat chambers so as to receive heat from the latter. The waste heat chambers and the preheating chambers form recuperators. The flues which form the heating walls are straight and extend along the long sides of the oven chambers. The flow of the heating gases in alternate heating flues, the one lying above the other, passes in opposite directions. The direction of the flow remains constant. It is not reversed.

In the drawings I have shown the invention as applied to double vertical ovens:

Figure 1:
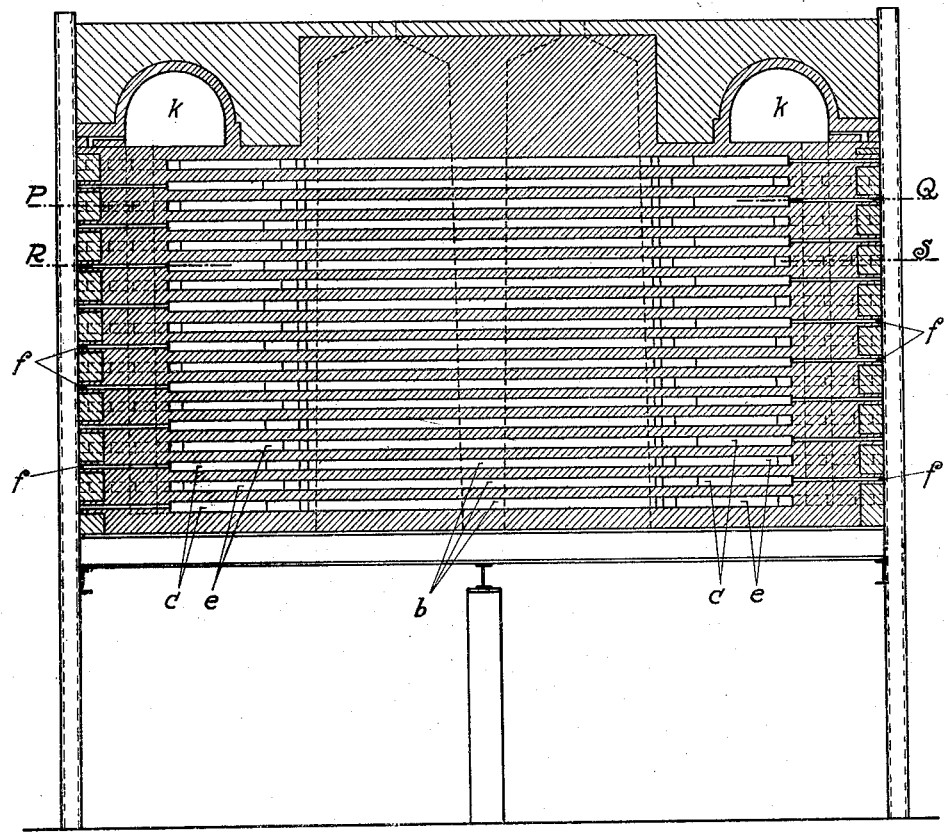
Fig. 1 is a vertical section on line "N—O" of Figure 2.
Figure 2:
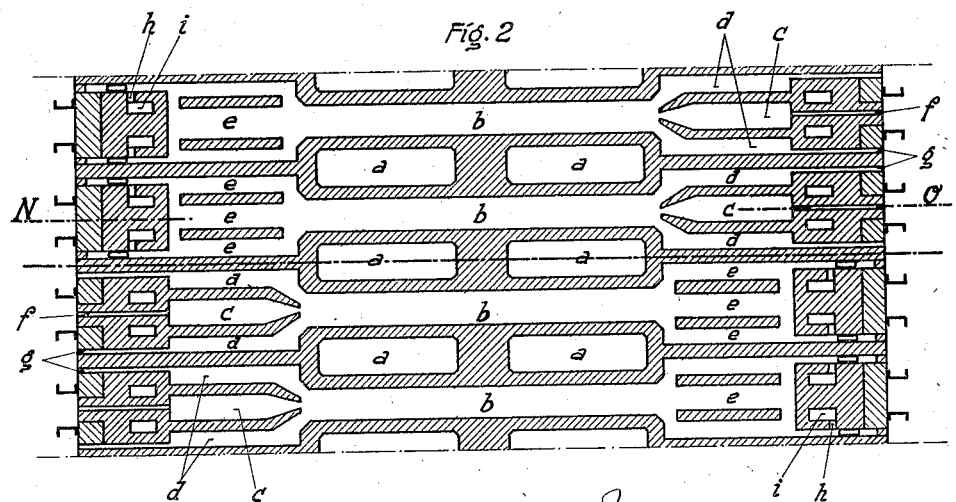
Fig. 2 is a transverse section, one on line "P—Q" and the other on line "R—S" of Figure 1.

In the invention as shown in the drawing, in Figures 1 and 2, "$a$" are the vertical oven chambers with the heating flues "$b$" forming the heating wall placed between them. The flues "$b$" form each one straight flue which extends along the entire length of the long sides of the oven chambers. At one end of each flue, forming a prolongation or axial extension of the flue, is arranged a gas preheating chamber "$c$" and an air preheating chamber "$d$," at the other end the waste heat chamber "$e$." Gas is continuously supplied at "$f$" and air at "$g$." The gas preheating compartment lies between the two branches of the air preheating compartment. The waste heat from the waste heat chambers is discharged thru openings "$h$" and flues "$i$" to the stackflue "$k$." For each two superposed flues the location of the chambers is interchanged. The heating flues are thus alternately connected in the vertical direction at each front of the oven to an air and gas preheating chamber and to a waste heat chamber. The air and gas preheating chambers are thus located between two waste heat chambers.

The very simple construction and easy accessibility of all parts of the new system allow an exact and easy regulation in all parts of the oven, and in consequence of the short and straight running of all the flues, there is very little resistance to be overcome and leakage between gas and air and waste heat is avoided.

What I claim and desire to secure by Letters Patent is:

1. In a two-faced vertical chamber oven in which the oven chambers are arranged in rows, at least two oven chambers in each row, the combination of heating walls between the rows, each wall comprising a series of superposed heating flues, each running the whole length of the heating wall, and preheating chambers for gas and air connected to each heating flue at one front of the oven and a waste-heat chamber connected to each heating flue near the other front of the oven, the preheating chambers lying between the waste-heat chambers so as to receive heat from the latter.

2. In vertical chamber ovens in which the oven chambers are arranged in rows, the combination of heating walls between the rows, there being a heating wall common to two rows of oven chambers, each wall comprising a series of superposed heating flues, each running the whole length of the common heating wall, preheating chambers for gas and air connected to each heating flue at its front end and a waste-heat chamber connected to each heating flue at its other end, and a plurality of vertical waste-heat flues connected with the waste-heat chambers, the waste-heat chambers and the preheating chambers alternating at each front of the oven, so that the preheating chambers lie between the waste-heat chambers so as to receive heat from the latter.

3. In vertical chamber ovens in which the oven chambers are arranged in rows, the combination of heating walls between the rows, each wall comprising a series of superposed heating flues, each running the whole length of the heating wall, preheating chambers for gas and air connected to each heating flue at one end and a waste-heat chamber connected to each heating flue at the other end, the said chambers forming axial extensions of the flues, the waste-heat chamber of one flue supplying heat to the preheating chamber of the adjacent flue, a plurality of vertical waste-heat flues connected with the waste-heat chambers, and a horizontal stack flue above the heating flues and connected with said waste-heat flues.

4. In a two-faced vertical oven in which the oven chambers are arranged in rows, at least two oven chambers in each row, the combination of heating walls between the rows, each wall comprising a series of superposed heating flues, each running the whole length of the heating wall, preheating chambers connected to each heating flue at its end near one front of the oven, said preheating chambers having two compartments, one for gas, the other for air, the gas preheating compartment lying between the branches of the air preheating compartment, and waste-heat chambers connected to each heating flue at its end near the other front of the oven, the preheating chambers lying between the waste-heat chambers so as to receive heat from the latter.

5. In a two-faced vertical chamber oven, in which the oven chambers are arranged in rows, at least two oven chambers in each row, the combination of heating walls between the rows, each wall comprising a series of superposed heating flues, each running the whole length of the heating wall, a preheating chamber for gas and air connected with each heating flue at its end near one front of the oven, a waste-heat chamber connected with each heating flue at its end near the other front of the oven, the preheating chambers lying between the waste-heat chambers so as to receive heat from the latter, and means for continuously supplying gas and air to the preheating chambers, the direction of flow of the burning gases in each heating flue remaining unchanged, but the direction of travel being opposite in adjacent flues.

In testimony whereof, I have signed my name to this specification.

CARL OTTO.